United States Patent Office 3,803,261
Patented Apr. 9, 1974

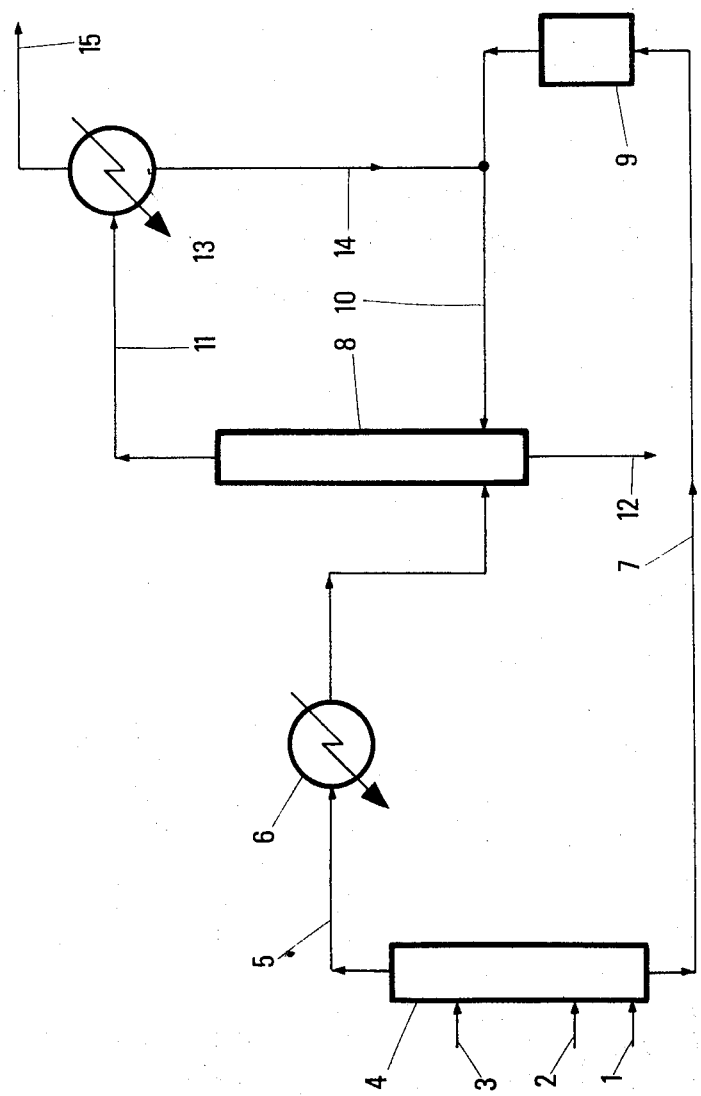

3,803,261
HYDROGENATION OF UNSATURATED COMPOUNDS
Maurice Born, Nanterre, Christian Lassau, Villepreux, Chan Trinh Ding, Malmaison, and Quand Dang Vu, Paris, France, assignors to Institut Francais du Petrole, des Carburants et Lubrifiants, Rueil-Malmaison, France
Filed Mar. 2, 1973, Ser. No. 337,696
Claims priority, application France, Mar. 3, 1972, 7207634
Int. Cl. C07c 5/02, 11/02
U.S. Cl. 260—683.9        8 Claims

ABSTRACT OF THE DISCLOSURE

Process for hydrogenating an unsaturated liquid compound comprising dissolving a catalyst therein and contacting the resulting liquid with a hydrogen-containing gas, vaporizing at least 50% of the hydrogenated product and condensing said fraction and contacting the remaining fraction of hydrogenated product with an adsorbent for removing the catalyst contained therein.

---

The present invention relates to a new process for hydrogenating unsaturated compounds, wherein the reaction is conducted in the liquid phase by using as a catalyst, a derivative of a transition metal dissolved in the feed stock to be treated.

By derivative of a transition metal, is meant a catalyst obtained by the action of a nickel, cobalt and/or iron salt on an organo-lithium compound or on an aluminum derivative of the Ziegler type or a derivative of lithium or sodium aluminum hydride. More particularly, the metal salt may be a salt soluble in hydrocarbons such as, for example, an alcoholate, e.g. acetylacetonate, or a salt of a carboxylic acid having for example from 1 to 20 carbon atoms such as the naphthenic, stearic, 2-ethyl hexanoic and decanoic acids.

As non-limitative examples of organo-lithium compounds according to the invention, there are propyl-lithium compounds, butyl-lithium and phenyl-lithium.

By Ziegler derivative, is meant an aluminum compound of the formula $AlX_1X_2X_3$ in which the radicals $X_1$, $X_2$, $X_3$ which are identical to or different from one another, are either a hydrogen atom or a monovalent radical R or OR, R being a monovalent hydrocarbon radical having, for example, from 1 to 20 carbon atoms. In the case where radicals OR are used, at least one of the radicals $X_1$, $X_2$, $X_3$ is either hydrogen or R.

By lithium or sodium aluminum hydride derivative, there is meant, not only the pure products $NaAlH_4$ and $LiAlH_4$, but also, on the one hand, the products obtained by substitution of one, two or three hydrogen atoms by an alkoxy radical OR′, R′ being a monovalent radical which may contain, in addition to the carbon and hydrogen atoms, such heteroatoms as oxygen, and, on the other hand, the products obtained by substituting one, two or three hydrogen atoms with a monovalent hydrocarbon radical R.

The molar ratio of the transition metal derivative to the reducing agent, may vary according to the type of reducing agent. It is generally from 0.5 to 10, and preferably from 1 to 5. The hydrogen pressure is not critical and may vary from 0.1 to 50 atmospheres, preferably from 0.5 to 20 atmospheres. The hydrogenation is conducted at relatively low temperatures within the range of from 0° C. to 250° C., preferably from 25° C. to 200° C. The conversion may vary according to the requirements; it is generally from 30 to 99.9%, and preferably from 50 to 99%. For obtaining the desired conversion, the number of reaction vessels is not critical and may be 1, 2 or 3.

More particularly, the invention is remarkable by the fact that the major part of the product is withdrawn in the gaseous phase from the reaction medium and then condensed, said effluent corresponding to 50 to 99% of the total product withdrawn from the reactor. According to another remarkable feature of the process, the complement to 100 % of the product withdrawn from the reactor is withdrawn in the liquid phase and, after percolation through a bed of an adsorbent such as alumina, silica, activated earth, active carbon, it is either admixed with the condensed gaseous effluent or recycled to the reactor.

By unsaturated hydrocarbons, is meant the olefinic, di-olefinic, acetylenic compounds, containing for example from 2 to 20 carbon atoms, such as propylene, butenes, pentenes, hexenes, heptenes, cyclopentene, cyclohexene, allene, 1,3-butadiene, 1,2-butadiene, isoprene, pentadienes, cyclopentadiene, methylacetylene, 1-butyne, 2-butyne, vinylacetylene, pentynes, hexynes, etc.

The purity of the unsaturated hydrocarbons feed and accordingly, that of the gaseous or liquid effluents is not critical and there may be used unsaturated hydrocarbons containing inert hydrocarbons from $C_1$ to $C_{20}$ such for example as methane, ethane, propane, butane, etc. A propylene cut produced for example from steam-cracking may be used, according to the invention, without any special treatment. The same is true for a cut with a high butadiene content.

The hydrogenation may be only partial (selective) or may be total.

The purity of the hydrogen may vary. In particular, it may contain up to 50% of inert gas such as argon, methane, nitrogen and, for example, up to 300 p.p.m. of water, carbon monoxide or sulfur or oxygenated compounds such as mercaptans, sulfides, aldehydes, ketones.

A preferred embodiment of the invention is illustrated in the accompanying drawing.

The feed to be hydrogenated is introduced through line 2 into the reactor 4 and a gas of high hydrogen content is fed through line 3.

The catalyst dissolved in the hydrocarbon solvent which may be in particular the feed itself or one of the effluents is conveyed through line 1.

The major part of the product and of the unconverted hydrogen is withdrawn in the gaseous phase through line 5 and is passed through the exchanger 6 and sent to the lower portion of the stabilization column 8 while the complement, withdrawn in the liquid phase through line 7 and after percolation through a bed of adsorbent contained in the purifying vessel 9, is introduced through line 10 at the lower part of the stabilization column 8 where it is admixed with the gaseous effluent.

The gaseous phase issued from the stabilization column 8 is sent through line 11 to the condenser 13 wherefrom a gas is withdrawn through line 15, which as a high content of hydrogen and inerts, such as methane for example.

Through line 14 which connects the condenser 13 to line 10, there is recycled a liquid phase with a high content of hydrocarbon products which have been carried away.

There is finally obtained through line 12, the desired product.

In order to obtain the desired result (withdrawal of more than 50% of the product in the gaseous phase) it suffices, once the reaction temperature has been chosen, to select the pressure so that said vaporization is possible. This selection is very easy for any one skilled in the art.

The following examples illustrate the process but are by no way intended to limit the scope of the invention.

EXAMPLE 1

This example makes use of the flow sheet of the accompanying drawing.

For hydrogenating propylene to a product containing 90% of propane and 10% of propylene, there is used, as the catalyst, a mixture of nickel stearate and triethylaluminum in an atomic ratio of Al/Ni equal to 3, the ratio by weight of Ni to the hydrocarbon feed being equal to 10 p.p.m.

The reaction is conducted at 50° C. under a hydrogen partial pressure of 2 bars and a total pressure of 28 bars. 95% of the propylene is withdrawn in the gaseous phase and 5% in the liquid phase. The gaseous $C_3$ hydrocarbons are condensed in the condenser 6. In the stabilization column, the temperature is 35° C. The adsorbent is alumina. The VVH (volume of liquid phase per volume of adsorbent per hour) is 1.

The compositions of the propylene liquid feed and of the gas with a high hydrogen content which feed the hydrogenation reactor, as well as the compositions of the gaseous and liquid effluents issued respectively from lines 15 and 12 are given in the following table:

|  | Composition in moles/hour | | |
| --- | --- | --- | --- |
|  | At the reactor inlet | In line 15 | In line 12 |
| Hydrogen | 94,400 | 7,831 | 769 |
| Methane | 7,100 | 4,177 | 2,923 |
| Propylene | 95,800 | 465 | 9,535 |
| Propane | 4,200 | 3,253 | 86,747 |

EXAMPLE 2

Example 1 is repeated but with the following changes:
Feed: $C_4$ cut containing 57% of butadiene+butyne; 38% of butenes; and 5% of butane.

The reaction is conducted at 110° C. under a hydrogen pressure of 3 bars and a total pressure of 28 bars.

95% of the product is discharged from the reactor in the gaseous phase and 5% in the liquid phase. The $C_4$ hydrocarbons of the gaseous phase are condensed and admixed with those of the liquid phase which have passed through the alumina bed. The content of the product (mixture of butane and butenes) in butadiene and butynes is lower than 0.5% by weight.

EXAMPLE 3

There is introduced cetane, as solvent, in the reaction zone. 100 moles of propylene per time unit are fed to the reactor, as well as a gas containing 95% of hydrogen and 5% of methane by moles. The total pressure is 25 bars and the temperature 180° C. Per time unit, there are withdrawn in vapor phase, 95 moles of propane, 5 moles of propylene, methane and residual hydrogen. Simultaneously, there is withdrawn a portion of the liquid phase carrying along therewith 5 moles of $C_3$ hydrocarbons per time unit; it is passed through a bed of bauxite and then fed back to the reactor.

The withdrawn vapor phase is condensed and there is thus obtained a liquid mixture of propane and propylene which can be used as a liquid fuel.

The invention is not limited to the above examples. For example, there can be used as the percolation agent, alumina, bauxite, silica, kieselguhr, bleaching clay, active carbon or fly ash, while conducting the reaction at a temperature of from −20 to +200° C., with preferably, an hourly flow rate of 0.1 to 10 liters of liquid per liter of adsorbent and per hour. The invention is not limited to the selection of particular adsorbents.

It must be understood that the invention is not limited to the use of particular catalysts. As a matter of fact, the used catalysts are well known and described in the art.

When operating with a heavy solvent, this solvent may be a saturated hydrocarbon having, for example, from 8 to 25 carbon atoms, e.g. cetane, decahydronaphthalene or a cut of saturated hydrocarbons normally boiling between 250 and 350° C. In the case of use of a heavy solvent, the totality of the effluent, after passage thereof into contact with the adsorbing agent, is recycled to the reactor.

What we claim is:

1. A process for hydrogenating an unsaturated compound, in which said compound is contacted, in a liquid phase containing a catalyst in a dissolved state, with a gaseous hydrogen stream in a hydrogenation zone, wherein said contact is carried out under conditions in which from 50 to 99% of the hydrogenated product, are vaporized, said vaporized fraction is withdrawn and condensed by cooling in order to obtain the product in the liquid state, a liquid fraction which contains from 1 to 50% of the hydrogenated product is simultaneously withdrawn from the hydrogenation zone and is contacted with an adsorption agent for removing the catalyst contained therein.

2. A process according to claim 1, in which the liquid phase passing through the adsorbent bed is joined to the condensate of the hydrogenated product issued from the gaseous phase.

3. A process according to claim 1, in which the catalyst is obtained by contacting a derivative of a transition metal with a reducing agent of the Ziegler type, an organolithium compound of a reducing agent of the aluminum and sodium or lithium double hydride type or their derivatives.

4. A process according to claim 1, in which the hydrogen partial pressure in the reactor is from 0.5 to 20 atmospheres and the reaction temperature is from 25 to 200° C.

5. A process according to claim , in which the unsaturated compound is an unsaturated hydrocarbon having from 2 to 20 carbon atoms.

6. A process according to claim 5, in which the feed to be treated is an unsaturated $C_3$ cut.

7. A process according to claim 5, in which the feed be treated is an unsaturated $C_3$ cut.

8. A process according to claim 1, in which the hydrogenation is carried out in a heavy solvent and all the withdrawn liquid fraction is recycled after contact with the adsorption agent.

References Cited

UNITED STATES PATENTS

| 3,110,747 | 11/1963 | Mullineaux | 260—677 H |
| 3,205,278 | 9/1965 | Lapporte | 260—667 |
| 3,366,646 | 1/1968 | Dewhirst | 260—683.9 |
| 3,412,174 | 11/1968 | Kroll | 260—683.9 |
| 3,463,830 | 8/1969 | Dunning et al. | 260—683.9 |
| 3,524,899 | 8/1970 | Caudlin et al. | 260—683.9 |
| 3,644,445 | 2/1972 | Kroll | 260—683.9 |
| 3,732,329 | 5/1973 | Thatcher et al. | 260—683.9 |
| 3,743,684 | 7/1973 | Johnson et al. | 260—683.9 |
| 3,663,635 | 5/1972 | Lessau et al. | 260—666 P |
| 3,454,644 | 7/1969 | Dewhirst | 260—683.9 |

DELBERT E. GANTZ, Primary Examiner

V. O'KEEFE, Assistant Examiner

U.S. Cl. X.R.

260—666, 667, 677 H

UNITED STATES PATENT OFFICE
CERTIFICATE OF CORRECTION

Patent No. 3,803,261      Dated April 9, 1974

Inventor(s) Maurice Born, et al.

It is certified that error appears in the above-identified patent and that said Letters Patent are hereby corrected as shown below:

IN THE CLAIMS:

CLAIM 7, COLUMN 4, LINE 1 OF THE CLAIM: After "feed", insert -- to --; and IN LINE 2 OF THE CLAIM: "$C_3$" should read -- $C_4$ --.

Signed and sealed this 13th day of August 1974.

(SEAL)
Attest:

McCOY M. GIBSON, JR.
Attesting Officer

C. MARSHALL DANN
Commissioner of Patents